Nov. 6, 1923.

S. C. GOULD 1,473,288

TOWLINE BUMPER

Filed June 6, 1923

INVENTOR
S. Charles Gould
BY
G. H. Braddock
ATTORNEY

Patented Nov. 6, 1923.

1,473,288

UNITED STATES PATENT OFFICE.

SAMUEL CHARLES GOULD, OF BRIDGEPORT, CONNECTICUT.

TOWLINE BUMPER.

Application filed June 6, 1923. Serial No. 643,665.

*To all whom it may concern:*

Be it known that I, SAMUEL CHARLES GOULD, a citizen of the United States, and resident of Bridgeport, in the county of Fairfield and State of Connecticut, have invented certain new and useful Improvements in Towline Bumpers, of which the following is a specification.

This invention relates to a tow line bumper, and has more particular reference to a device which can be utilized in connection with a vehicle as an ordinary bumper, or as a push or pull tow line.

An object of the invention is to provide a bumper adapted to be put to use as a push or pull tow line when occasion requires.

And a further object is to provide a novel push and pull tow line bumper which will be of simple and economic construction.

With the above and other objects in view, the invention comprises the construction, arrangement and combination of parts as now to be fully described and as hereinafter to be specifically claimed.

In the accompanying drawing forming a part of this specification,

Figure 1:
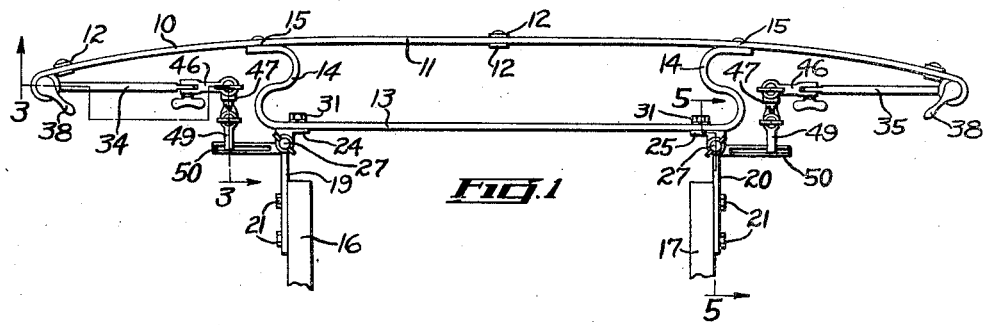
Fig. 1 is a plan view of the device as applied to use as an ordinary bumper.

With respect to Figs. 1 to 5 of the drawing, 10 denotes a bumper of ordinary or preferred construction. As disclosed, the bumper consists of forward bars 11, adapted to extend beyond the sides of a vehicle frame as is usual, held in spaced relation as by cross-pieces 12, and a rearward bar 13 having its end portions 14 bent in suitable fashion to be secured to the forward bars 11 as at 15. The rearward bar 13 is adapted to span the distance between the opposite side members 16, 17 of the frame, and is provided with aligning, elongated slots 18 where the bumper can be secured to vehicle frames of varying widths.

Numerals 19, 20 represent brackets secured to the opposite side members of the frame as by screw bolts 21, and each of these brackets has perforated and spaced apart eye members 22, 23 arranged in vertical alignment.

Figures 3, 5:
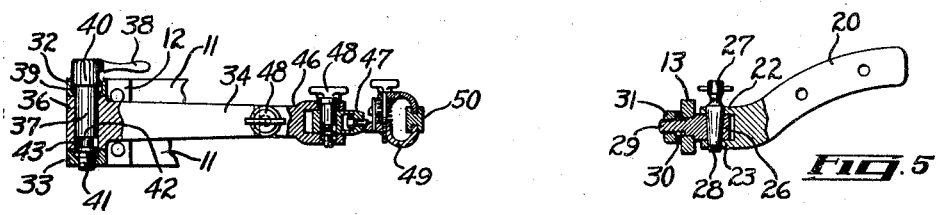
Fig. 3 is an enlarged sectional view on line 3—3 in Fig. 1.
Fig. 5 is an enlarged sectional view on line 5—5 in Fig. 1.

As best shown in Fig. 5, the rearward bar 13 is removably supported from the brackets 19, 20 by means of smaller brackets 24, 25 each having an eye member 26 adapted to fit between the eye members 22, 23, a taper pin 27 passing through all of the eye members and having a thread 28 engaging a thread of the eye member 23 insuring the position of each smaller bracket 24, 25. Each bracket 24, 25 is also provided with a threaded stud 29 adapted to enter a slot 18 in the rearward bar of the bumper, and upon each threaded stud 29 is a washer 30 and nut 31. Evidently, the studs 29 can be adjusted to desired position in the slots 18, and the nuts 31 can be fastened down to draw the smaller brackets and washers 30 against the rearward bar to fix the studs in the elongated slots.

Figure 4:
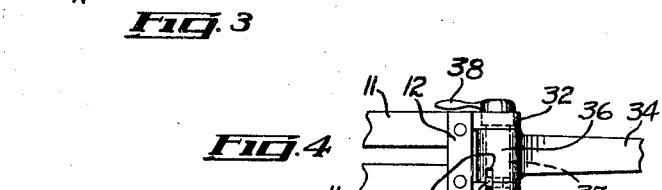
Fig. 4 is a detail view to better show the manner in which the tow line attachments may be fastened in aligning relation with the bumper proper when the device is to be used as a push or pull tow line.

As very clearly disclosed in Figs. 3 and 4, the opposite ends of the forward bars 11 are spaced to provide eye members 32, 33 arranged in vertical alignment, 34, 35 representing tow line attachments each having an eye member 36 arranged between the eye members 32, 33. In the instance of each tow line attachment, a pivot pin 37 with manipulating handle 38 provides means for removably and pivotally securing the eye member 36 between the eye members 32, 33. As disclosed, each eye member 32 has a cavity 39 receiving an enlarged portion 40 of the pivot pin, and each eye member 33 has a thread receiving a threaded portion 41 of said pin, see Fig. 3, and as will be clear from Figs. 3 and 4, each pivot pin has a keyway 42 with key 43 adapted to normally remain in a slot 44 in the eye member 36, but to concurrently lie in said slot 44 and in a slot 45 in the eye member 33 when the enlarged portion 40 of the pivot pin engages the bottom of the cavity 39 of the eye member 32. Evidently, this arrangement provides for a free pivoting movement of the tow line attachments with respect to the forward bars of the bumper, and also provides for locking said tow line attachments against movement relatively to the bumper. As will be clear from Fig. 4, the slots 44, 45 are arranged to be continuations of each other when the tow line attachments are in alignment with the bars of the bumper, and it is in this relative position of the elements of the device that it is desirable to fix the bumper proper and tow line attachments against relative movement. That is to say, the device is adapted for use as a push or pull tow line when the attachments 34, 35 are locked in aligning relation with the bars of the bumper.

Figure 2:
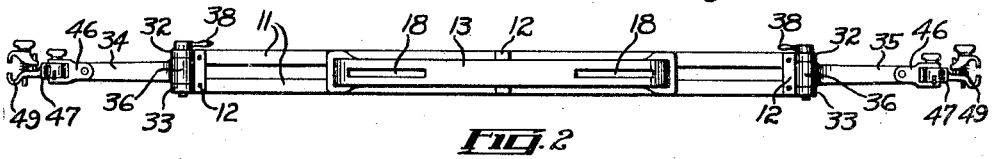
Fig. 2 is an elevational view on a smaller scale of the device, removed from a vehicle and arranged to be used as a push or pull tow line, as seen when looking toward the lower side of Fig. 1.

As shown more clearly in Figs. 1 to 3, the tow line attachments 34, 35 are each provided with a link 46 pivoted upon said attachments, and to the links 46 other links 47 are pivoted, the joints 48 between the links preferably being of the nature of the joints between the forward bar of the bumper and the tow line attachments already described, to be capable of free pivoting movement when out of alignment with the bumper, attachments, and each other, but capable of being locked in aligning relation. Each link 47 pivotally supports a clamp member 49 adapted to be removably associated with a suitable extension 50 of each bracket 19, 20, or to be removably secured, respectively, to a towing and a towed vehicle.

The manner in which the novel device is used is apparent. When the device is employed as an ordinary bumper, the tow line attachments and the links are as shown in Fig. 1. That is, the attachments lie between the ends of the forward bars and the bent portions 14 of the rearward bar, the links 46 and 47 assuming the positions as disclosed and the clamp members 49 being associated with the extensions 50. When the device is employed as a push or pull tow line, the bars of the bumper, the tow line attachments and the links are all locked in alignment in a manner fully set forth, and the clamps 49 are secured to some convenient part of a towing and a towed vehicle, the towed vehicle being either pushed or pulled, as may be desirable.

Figures 6, 7:
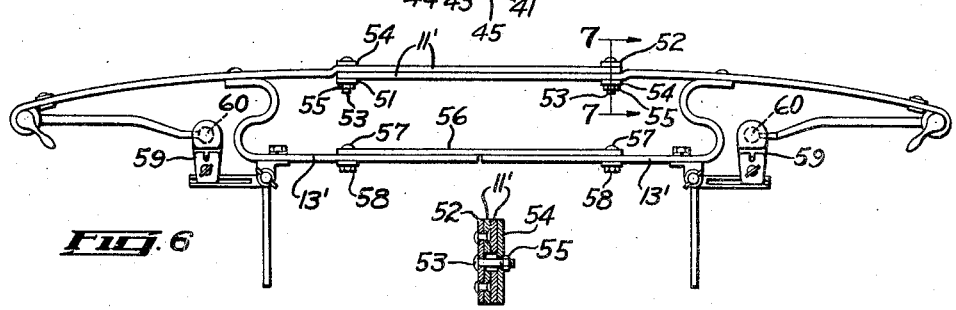
Fig. 6 is a plan view of a modified form of the device, corresponding with the showing of Fig. 1, no part of a vehicle frame being disclosed.
Fig. 7 is a sectional view on line 7—7 in Fig. 6.
Figure 8:
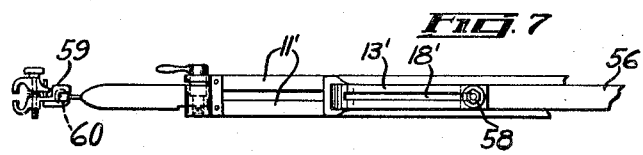
Fig. 8 is a fragmentary elevational view on a smaller scale of the device of Fig. 6 as seen when looking toward the lower side of said figure.

In Figs. 6 to 8 I have disclosed a modified form of the inventiton. Here the forward and rearward bars of the device are adapted to slide with respect to each other, whereby the bumper can be lengthened when used as a tow line, and can be adjusted to suitable length when used as a bumper. As shown, there are right and left forward bars 11', the end of each right forward bar being secured to a cross-piece 51, and the end of each left forward bar being secured to a cross-piece 52. In the instance of each set of bars 11', a bolt 53 with clamp 54 and nut 55 serves to fix the right and left bars relatively to each other either when the device is used as a bumper or as a tow line. See Fig. 7. Likewise, there is a right and left rearward bar 13' each having an elongated slot 18' as before. An extension member 56 affords an adjustable connection between said rearward bars, there being bolts 57 in the end portions of said extension member entering said elongated slots 18' and nuts 58 on said bolts for fixing the relation of the parts as will be understood. See Figs. 6 and 8.

In other particulars the device of Figs. 6 to 8 is the same as the device of Figs. 1 to 5, except that instead of the links 46 and 47, there is in the case of each tow line attachment a single link 59 secured to the attachment by means of a universal joint 60, and the means for locking the tow line attachments in alignment with the bars of the bumper is of slightly different construction, unnecessary to be described.

The manner of using the modified form of device is the same as that of using the form of Figs. 1 to 5, either to push or pull a vehicle to be towed. In either case, the rearward bar of the bumper is removed from the vehicle frame and the clamp members are removed from the extensions 50 of the brackets 19, 20 and are attached to a towing and a towed vehicle.

It is to be noted that various ways of constructing and arranging tow line attachments and appurtenances upon a bumper will suggest themselves to those skilled in the present art without departing from the spirit of the invention. While I have preferred to illustrate and describe two modifications of the invention, it is to be understood that the present disclosure is merely illustrative of the principles of the invention and meant in no way in a limiting sense, changes in details of construction and arrangement of parts being permissible so long as within the scope of the appended claims.

Having thus fully described the invention, what I claim as new and desire to secure by Letters Patent is:

1. A device of the character described, comprising a bumper and a tow line attachment secured to said bumper.

2. A device of the character described, comprising a bumper, and a tow line attachment secured at each end of said bumper.

3. A device of the character described, comprising a bumper having an attachment forming no part of said bumper as such, and means for utilizing said bumper and attachment to tow a vehicle.

4. In combination, a bumper, a tow line attachment secured thereto and forming no part of said bumper as such, and means whereby said attachment can be utilized with said bumper to tow a vehicle.

5. In combination, a bumper, a tow line attachment pivoted at each end of said bumper, means whereby said bumper can be secured to a vehicle to be used in ordinary manner, and means whereby said attachments can be secured to two different vehicles.

6. In combination, a bumper, an attachment pivoted thereto, said bumper adapted to be secured to a vehicle in ordinary manner and said attachment adapted to be supported upon said bumper to form no part of said bumper as such, and means for utilizing said attachment and bumper as a push and pull tow line.

7. A device of the character described, comprising a bumper, means for removably securing said bumper to a vehicle, an attachment upon said bumper forming no part of said bumper as such, and means for utilizing said attachment and bumper as a tow line.

8. A device of the character described, comprising a bumper consisting of bars adjustable as to length, and an attachment secured to said bumper, said bumper and attachment adapted to be utilized as a tow line.

9. A device of the character described, comprising a bumper adjustable as to length and adapted to be used as a tow line.

Signed at Bridgeport, in the county of Fairfield and State of Connecticut, this 5th day of June, A. D. 1923.

S. CHARLES GOULD.